(12) United States Patent
Hillen et al.

(10) Patent No.: US 8,375,814 B2
(45) Date of Patent: Feb. 19, 2013

(54) DRIVE DEVICE

(75) Inventors: Jörg Hillen, Noertershausen (DE);
Andreas Ritter, Hilgert (DE)

(73) Assignee: Stabilus GmbH, Koblenz (DE)

( * ) Notice: Subject to any disclaimer, the term of this patent is extended or adjusted under 35 U.S.C. 154(b) by 440 days.

(21) Appl. No.: 12/628,410

(22) Filed: Dec. 1, 2009

(65) Prior Publication Data

US 2010/0186528 A1 Jul. 29, 2010

(30) Foreign Application Priority Data

Jan. 28, 2009 (DE) .......................... 10 2009 006 512
Mar. 4, 2009 (DE) .......................... 10 2009 011 184

(51) Int. Cl.
| F16H 3/06 | (2006.01) |
|---|---|
| F16H 27/02 | (2006.01) |
| F16H 29/02 | (2006.01) |
| F16D 7/00 | (2006.01) |
| F16D 23/00 | (2006.01) |
| F16D 43/20 | (2006.01) |

(52) U.S. Cl. ...................... 74/89.38; 192/55.1; 192/56.1

(58) Field of Classification Search ................. 74/89.38, 74/89.39; 192/55.1, 56.1; 464/37
See application file for complete search history.

(56) References Cited

U.S. PATENT DOCUMENTS 4,702,112 A * 10/1987 Lawrie et al. ................... 73/629
5,601,491 A * 2/1997 Chan et al. ....................... 464/37
6,082,513 A * 7/2000 Li ................................ 192/56.1
6,158,295 A * 12/2000 Nielsen ......................... 74/89.38
7,487,709 B2 2/2009 Muller et al.
2004/0065762 A1* 4/2004 Mori et al. .................... 242/371
2008/0271552 A1* 11/2008 Arenz et al. ................. 74/89.23

FOREIGN PATENT DOCUMENTS

| DE | 102004006368 A1 | 8/2005 |
|---|---|---|
| EP | 0146914 | 4/1989 |

* cited by examiner

*Primary Examiner* — Justin Krause
(74) *Attorney, Agent, or Firm* — Cozen O'Connor

(57) ABSTRACT

A drive device includes a first fastening device (5), for connection to a stationary base part, especially a vehicle body, or to a movable part, especially a vehicle (hinged) lid or door; a second fastening device (24), for connection to the movable part or to the stationary base part; a spindle drive (17), which includes a threaded spindle (16) and a spindle nut (19) mounted on the threaded spindle (16) and capable of moving the first and the second fastening devices (5, 24) axially relative to each other; and a rotary drive (9), which rotates the spindle drive (17) by way of an overload safety device, wherein the nonrotatable connection between the two components can be released when a certain torque is exceeded, and wherein the overload safety device is formed by a clutch device (15), which comprises an inner part (32) connected to the rotary drive (9), which inner part rotates an intermediate part (34) by way of a damping element (33) and, by way of the intermediate part (34), rotates an outer part (36) connected to the spindle drive (17).

25 Claims, 19 Drawing Sheets

DRIVE DEVICE

BACKGROUND OF THE INVENTION

1. Field of the Invention

The present invention is directed to a drive device with a first fastening device, which can be connected to a stationary base part, especially a vehicle body, or to a movable part, especially a vehicle hinged lid or door; a second fastening device, which can be connected to the movable part or to the stationary base part; a spindle drive, comprising a threaded spindle and a spindle nut mounted on the threaded spindle and capable of moving the first and the second fastening devices axially relative to each other; and a rotary drive, which rotates the spindle drive by way of an overload safety device, wherein the nonrotatable connection between the two components can be released when a certain torque is exceeded.

2. Description of the Related Art

Many different variations of drives of this type are known. The disadvantage of these drives, however, is that misalignments and axial offsets lead to the generation of a considerable amount of noise and to an increased loss of performance.

An object of the present invention is to provide a spindle drive in which wider tolerances for the components are possible and misalignments and angular errors between the rotary drive and the spindle drive are compensated.

SUMMARY OF THE INVENTION

This object is achieved according to the present invention in that the overload safety device is formed by a clutch device, which comprises a inner part connected to the rotary drive, which inner part rotates an intermediate part by way of a damping element, and then, via the intermediate part, rotates an outer part connected to the spindle drive.

The inner part with the damping element and the intermediate part form a claw coupling.

For this purpose, the inner part comprises several radially outward-pointing projections on its outside lateral surface, and the intermediate part comprises an equal number of inward-pointing projections.

In particular, the projections on the inner part and the projections on the intermediate part are arranged with an offset to each other and do not touch each other.

According to the present invention, the intermediate part is connected to the outer part by a spring ring, wherein the spring ring is held in place on the outer part in both the axial and radial directions.

Further, several fingers of the spring ring extend in the axial direction into an equal number of recesses, formed in the outer part.

A secure connection is achieved in that the fingers have through-openings, in which projections formed in the recesses of the outer part engage.

Alternatively, some of the fingers project completely through the recesses, wherein the ends of the fingers are bent radially outward and latch onto the outer part at the ends of the recesses.

Further, the spring ring is connected to the intermediate part by way of several radially arranged spring arms, which engage in radially circumferential wave-like or triangular grooves in the outer lateral surface of the intermediate part, wherein the grooves are directly adjacent to each other.

According to the present invention, the spring arms comprise, at their free ends, two claw-like, radially inward-pointing projections, which engage in the grooves.

In an alternative embodiment, the spring ring is connected permanently and therefore nonrotatably to the intermediate part, and the spring ring is connected to the outer part by the spring arms, wherein the grooves are formed on the inside lateral surface of the outer part.

In an alternative embodiment, for the purpose of holding the spring ring in place, the projections are arranged on the outside surface of the outer part and project into the openings formed in the fingers of the spring ring when the ring is pushed onto the outer part from the direction of the connecting element, wherein the fingers extend axially over the outer part.

In another embodiment, several spring arms extend from the spring ring over the outer part in the axial direction. These arms are bent over at their ends radially toward the inside and taper down toward their outer ends, wherein the ends of the spring arms engage in some of the grooves formed in the intermediate part.

According to the present invention, a certain section of the intermediate part is accommodated rotatably in the outer part, whereas the grooves lie axially outside the outer part.

In an alternative embodiment, the outer part comprises several projections at the transition to the connecting element. These projections extend into the openings of the spring ring when the ring is pushed onto the end of the outer part facing the connecting element.

In an alternative embodiment, the end of the outer part facing the rotary drive comprises a retaining device. This retaining device forms a shoulder on which a support disk comes to rest.

In another embodiment, the retaining device comprises a snap ring, which is inserted into a groove, is formed as flanging, or comprises several fingers, the free ends of which are bent over radially toward the inside and which hold the support disk securely on the outer part.

Furthermore, a slip ring, the outside diameter of which is equal to or slightly less than the inside diameter of the outer part, lies on the support disk inside the outer part.

Further, the intermediate part comes to rest on the slip ring.

According to the present invention, the damping element is arranged between the inner part and the intermediate part and extends at least partially between the support disk and the intermediate part without contacting the support disk.

Alternatively, the damping element can be supported in the axial direction on the slip ring, so that the damping element will not make contact with the support disk when the damping element is significantly deformed under the action of strong torque and a bead extending toward the support disk is formed, which would have the effect of increasing the frictional force.

Further, a slider rests on the intermediate part, wherein the end surfaces of the intermediate part and the slider which are facing each other are provided with corresponding sets of serrations.

According to the present invention, the slider comprises recesses, into which guide webs, formed on the inside surface of the outer part, engage. A spring element, furthermore, pushes the slider against the intermediate part, thus pushing the one set of serrations into the other set of serrations.

According to the present invention, the clutch device is supported radially and axially in a spindle bearing, wherein a connecting device with a smaller outside diameter, into which the threaded spindle is introduced, is provided on the outer part.

So that the drive device can be operated conveniently, a sensor device comprises a internal gear, which is supported so that it can both rotate and wobble, and which is driven by the outer part of the clutch device, acting by way of a driver.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

Exemplary embodiments of the present invention are illustrated in the drawing in which.

DETAILED DESCRIPTION OF THE PRESENTLY PREFERRED EMBODIMENTS

Figure 1:
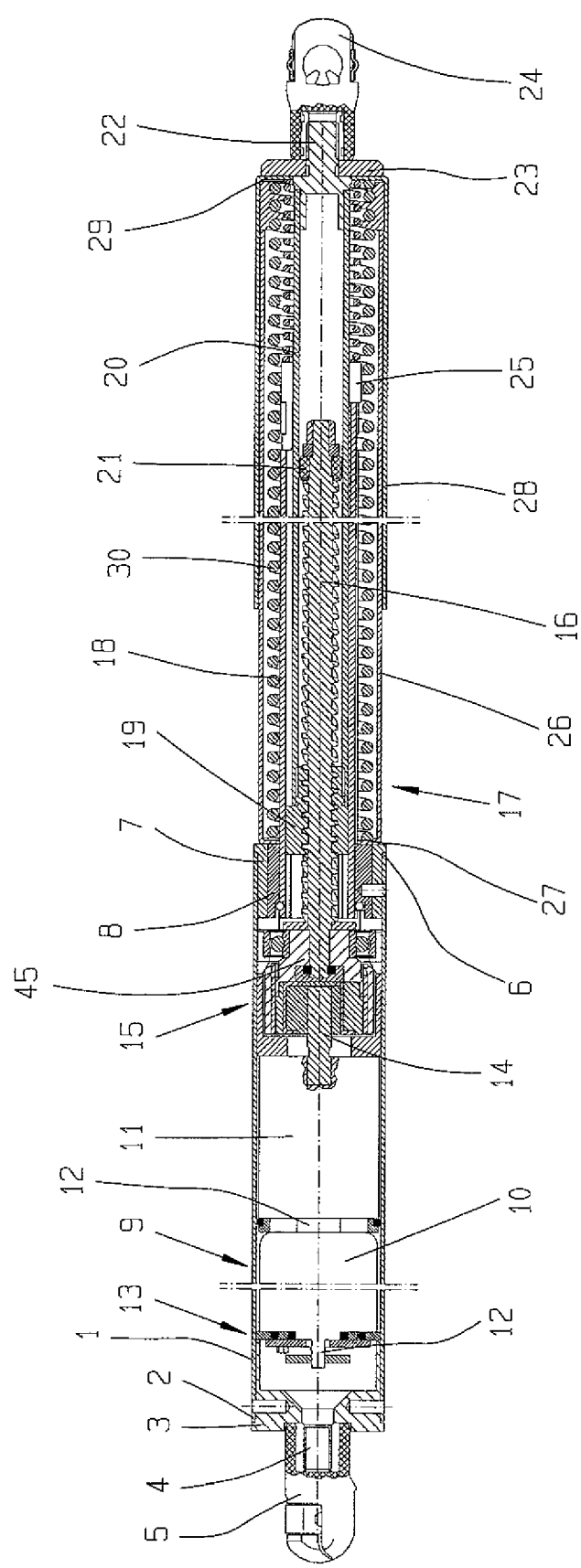
FIG. 1 shows a cross section through a drive device of the present invention.
Figure 2:
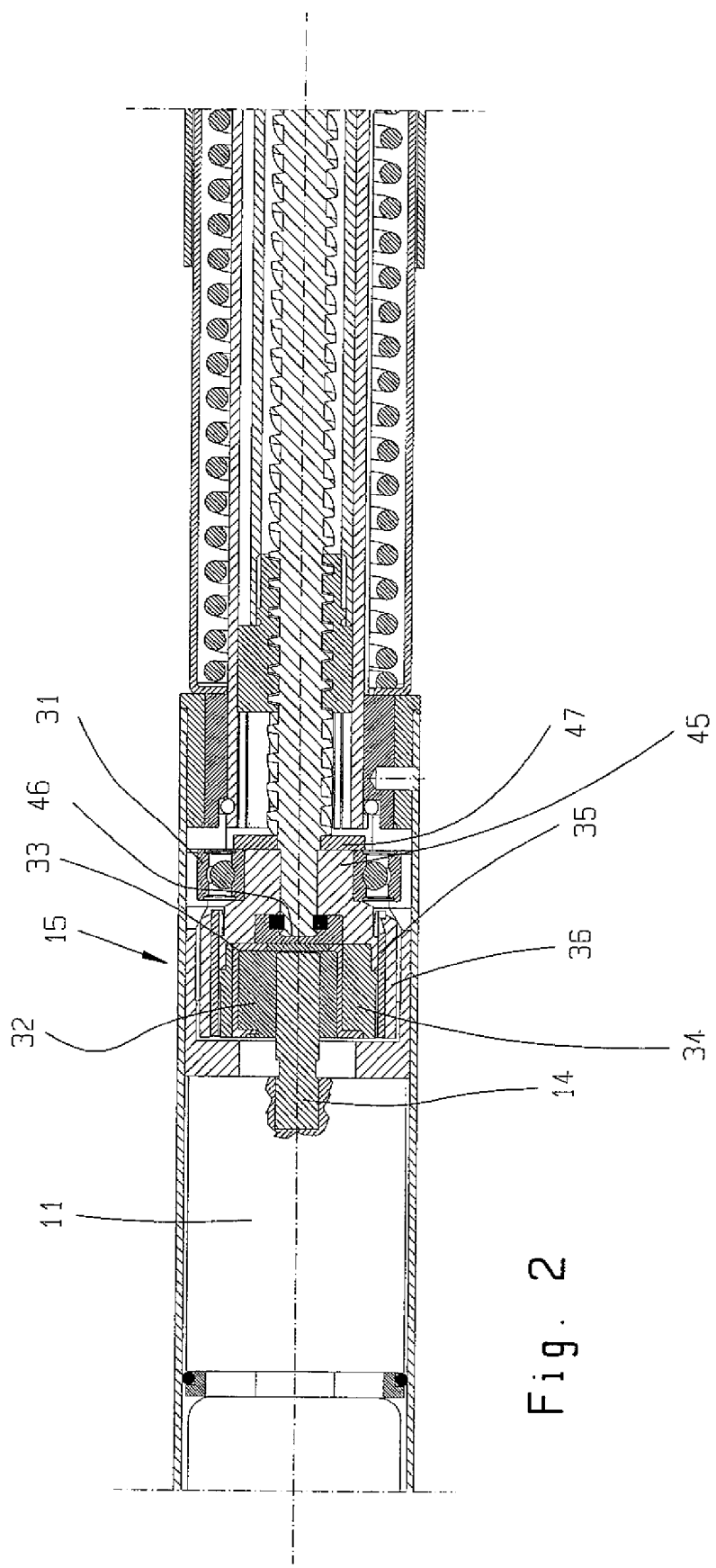
FIG. 2 shows a magnified view of part of the drive device according to FIG. 1.
Figure 3:
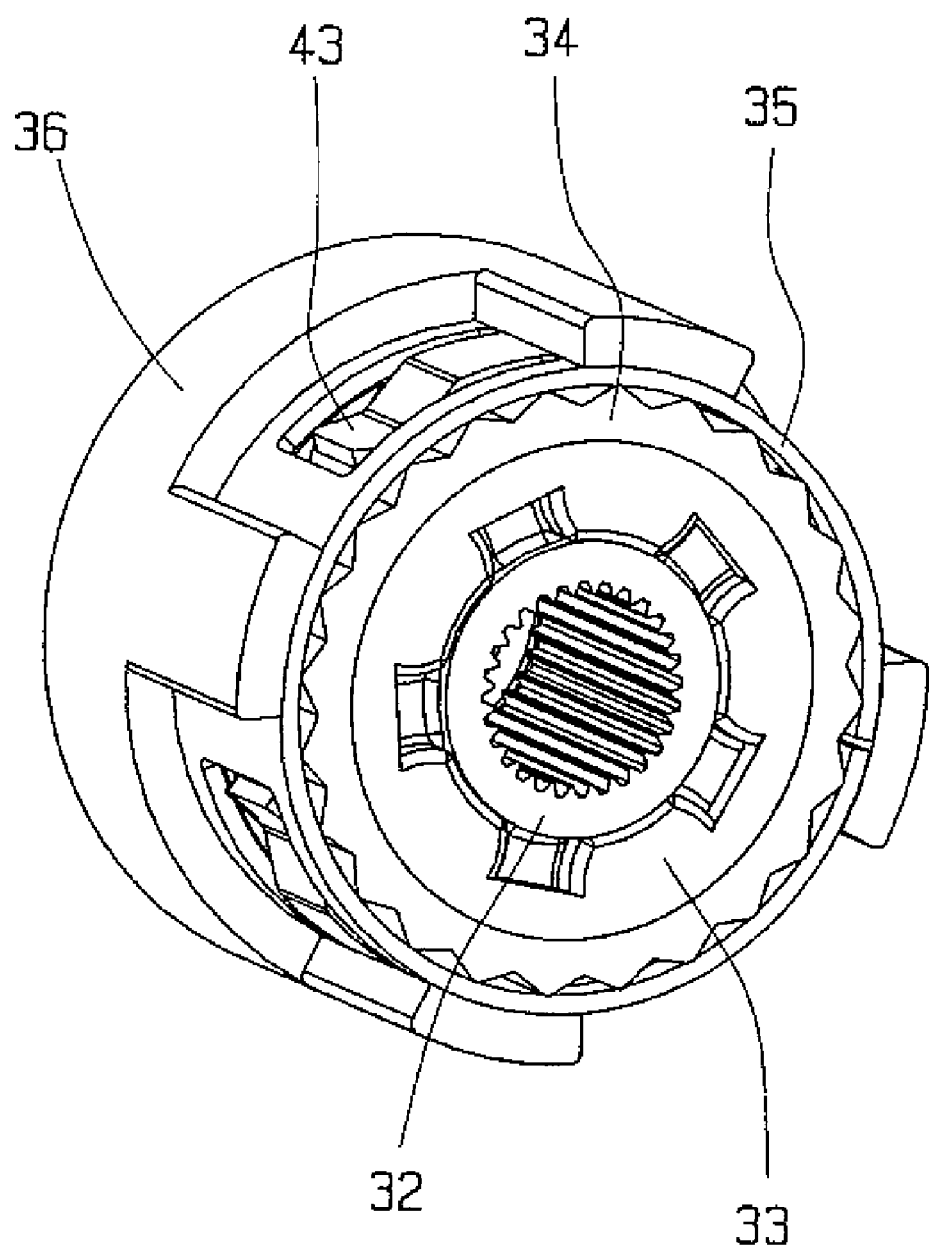
FIGS. 3-7 show detailed views of the clutch device, which is incorporated into the drive device according to FIG. 1.

The drive device shown in FIG. 1 has a first housing tube 1 with a first end 2, wherein the first end 2 is closed off by a bottom piece 3. A threaded pin 4 is formed on the bottom piece 3, and a first fastening device 5 in the form of a ball socket is screwed onto this pin. At the other end 6, i.e., the end opposite the first end 2, a sleeve 7, in which in turn a guide bush 8 is mounted with a press-fit, is arranged. Alternatively, however, it is also possible to design the sleeve 7 and the guide bush 8 as a one-piece unit.

Next to the first end 2 of the first housing tube 1 is a rotary drive 9, which comprises an electric motor 10 and a gearbox 11. A drive shaft 12 projects out of each end of the electric motor 10. One end of this shaft drives a sensor device 13, and the other end drives the gearbox 11. On the side of the gearbox 11 facing away from the electric motor 10, a gear output shaft 14 extends toward the second end 6. A clutch device 15 is connected at one end to the gear output shaft 14 and at the other end to a threaded spindle 16 of a spindle drive 17 extending through the guide bush 8. A guide tube 18, which coaxially surrounds the threaded spindle 16, also extends through the guide bush 8.

A spindle nut 19, which is guided in the guide tube 18 with freedom of axial movement but without the freedom to rotate, is mounted on the threaded spindle 16. The spindle nut 19 is connected to one end of a spindle tube 20, which coaxially surrounds the threaded spindle 16 and in which the threaded spindle 16 is guided by a spindle guide 21 located at the end opposite the clutch device 15 to prevent radial movements of the threaded spindle 16. At the end opposite the spindle nut 19, a threaded pin 22 is mounted on the spindle tube 20. A support disk 23 is mounted in turn on the threaded pin 22 and is held in place there by a second fastening device 24 in the form of another ball socket.

At the end of the guide tube 18 opposite the guide bush 8, a guide bush 25 is provided, which guides the spindle tube 20 and allows it to slide in the axial direction. The guide tube 18 is coaxially surrounded by a second housing tube 26, wherein the second housing tube 26 has an internal flange 27, by which it is supported on the guide bush 8 and the sleeve 7 at the second end 6 of the first housing tube 1.

The second housing tube 26 is in turn surrounded at least partially by a jacket tube 28. The jacket tube 28 comprises an inner flange 29, which rests against the support disk 23.

To support the outward travel of the drive device, a helical compression spring 30, which is supported at one end against the inner flange 27 of the second housing tube 26 and at the other end against the inner flange 29 of the jacket tube 28, is installed between the guide tube 18 on the outside and the second housing tube 26 and the jacket tube 28 on the inside.

FIGS. 2-6 show the individual parts of the drive device shown in FIG. 1, especially the individual components of the clutch device 15.

The clutch device 15 is located between the gearbox 11 and a spindle bearing 31. Other positions in the drive train, however, are also possible. The clutch device 15 comprises an inner part 32, a damping element 33, an intermediate part 34, a spring ring 35, and an outer part 36.

Figure 4:
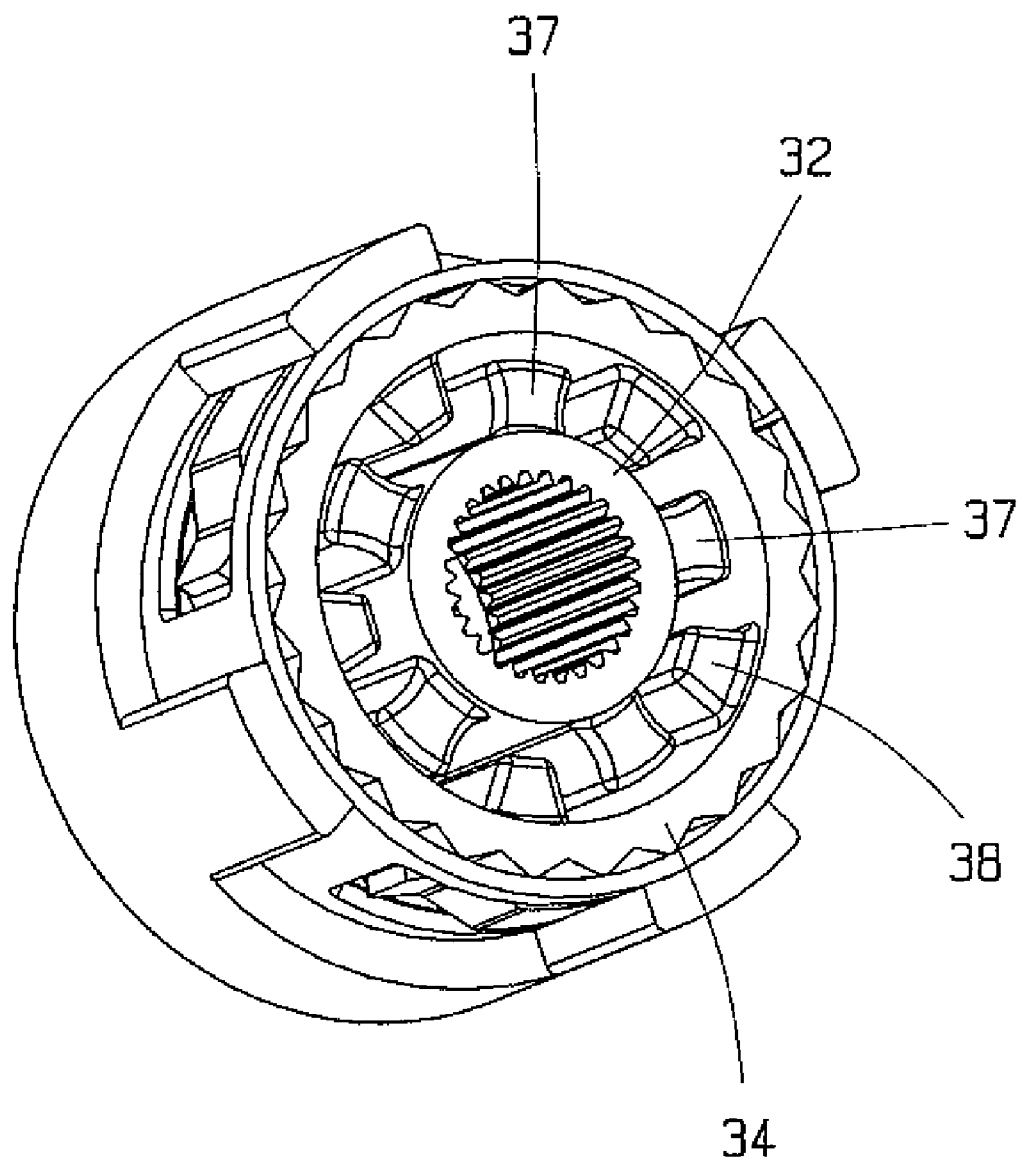
Figure 5:
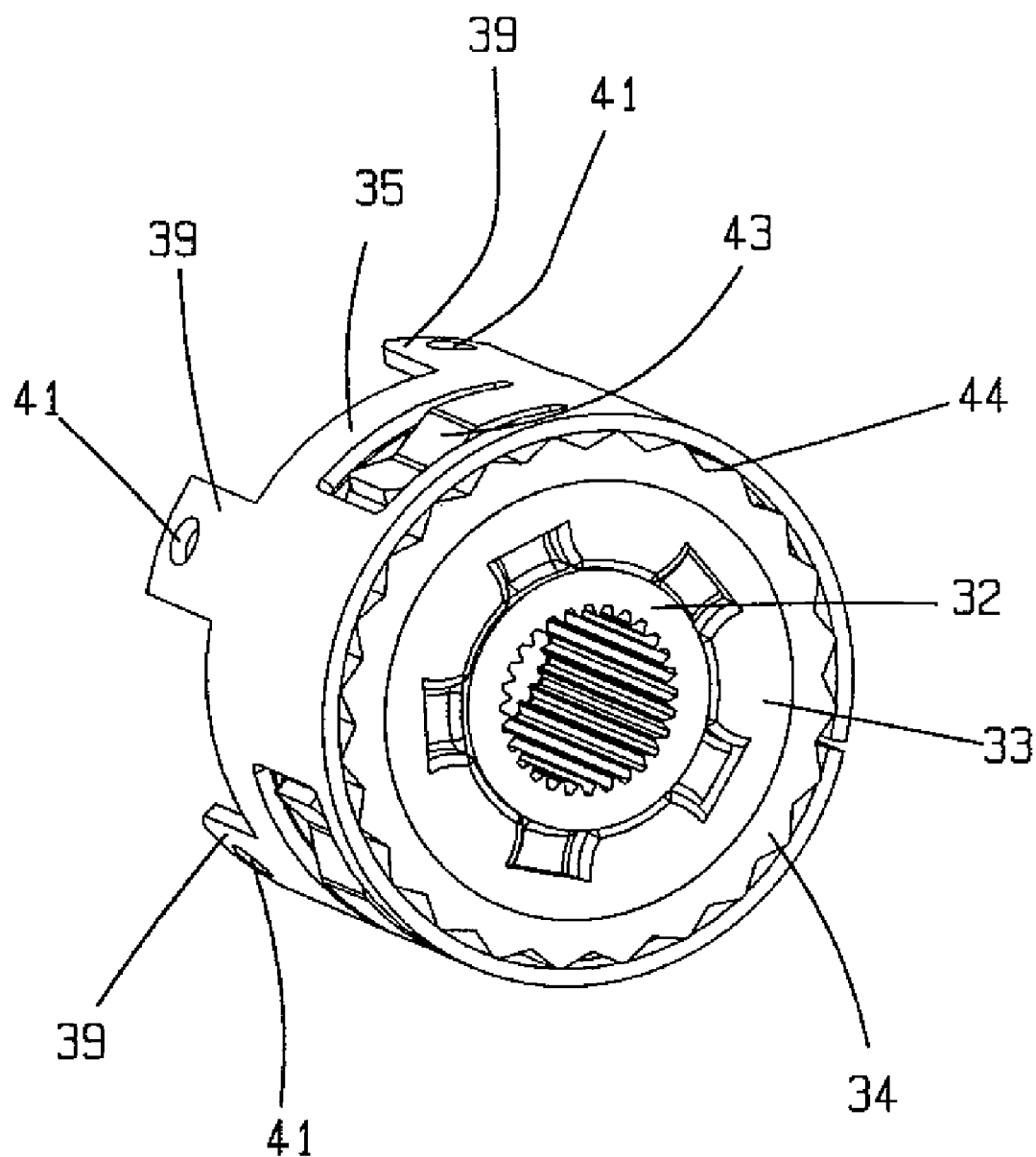
Figure 6:
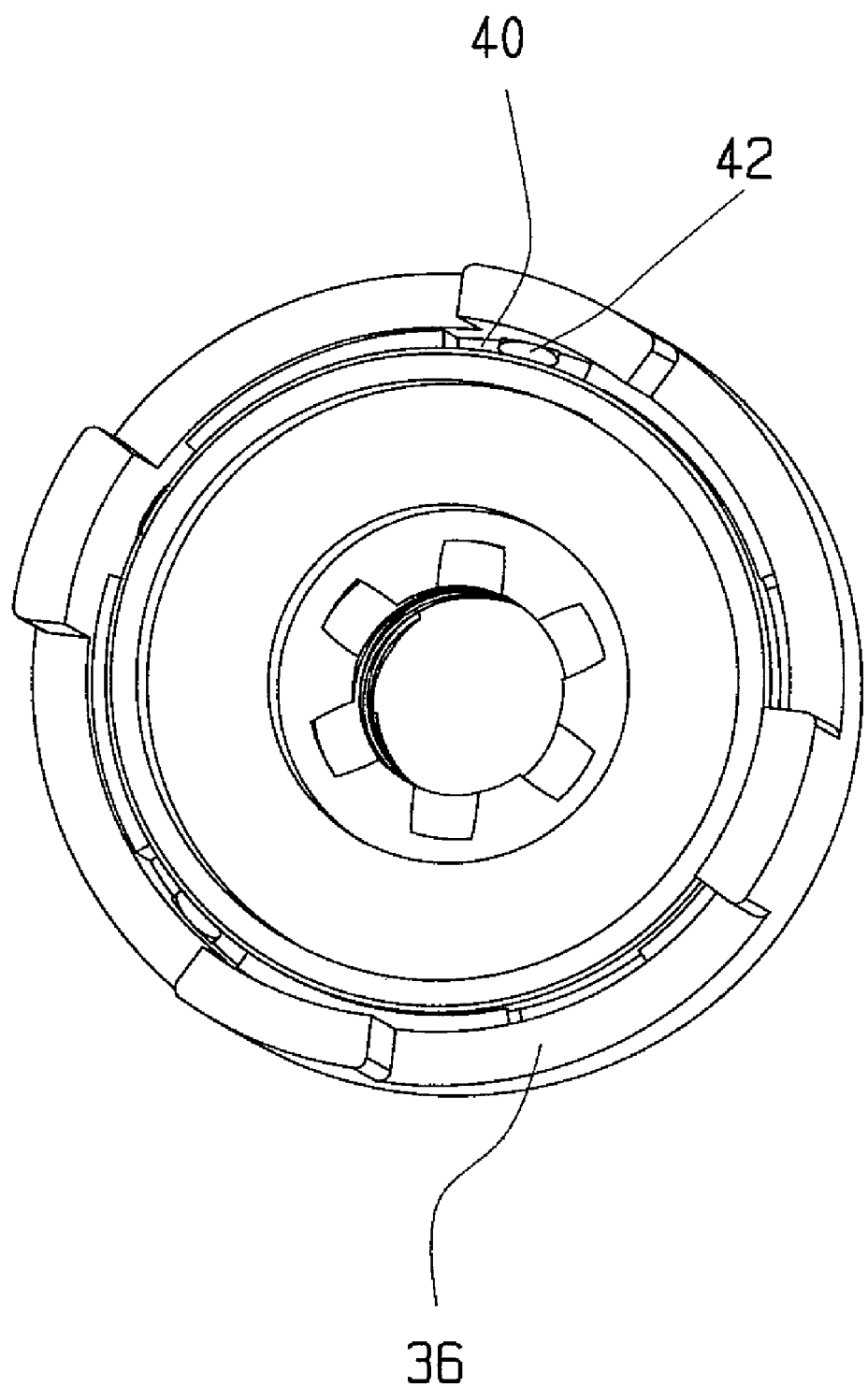

For transmitting torque, the gearbox output shaft 14 is connected to the inner part 32 by a positive or nonpositive type of insertion connection such as a spline connection. The inner part 32 works together with the damping element 33 and the intermediate part 34 to form an elastic claw-type clutch. For this purpose, as shown in FIG. 4, in which the damping element has been left out for the sake of clarity, the inner part 32 comprises several radially outward-pointing projections 37 on its outside lateral surface, and the intermediate part 34 has an equal number of radially inward-pointing projections 38. The two sets of projections are offset from each other and do not touch each other. The damping element 33 prevents contact between the intermediate part 34 and the inner part 32 in the radial and axial directions. The elastic claw clutch also compensates for axial offset and angular deviations between the threaded spindle 16 and the gearbox output shaft 14 and suppresses noise.

The intermediate part 34 is connected to the outer part 36 by the spring ring 35. The spring ring 35 is held in place in the outer part 36 in both the axial and radial directions. For this purpose, preferably several fingers 39 of the spring ring 35 project axially toward the second end 6 of the first housing tube 1 into an equal number of openings 40, which are formed in the outer part 36. Each of the fingers 39 comprises a through-opening 41, with which projections 42 formed in the openings 40 of the outer part 36 form a latching engagement.

The spring ring 35 is connected to the intermediate part 34 by way of several radially movable spring arms 43, which engage in radially circumferential, wave-like or triangular grooves 44 on the outside lateral surface of the intermediate part 34. The grooves 44 lie directly next to each other, like a set of serrations, to prevent the bent, angled ends of the spring arms 43 from positioning themselves between two grooves.

The torque is transmitted by way of the gearbox output shaft 14, the inner part 32, the damping element 33, the intermediate part 34, and the spring ring 35 to the outer part 36 of the clutch device 15.

The torque is transmitted between the spring ring 35 and the intermediate part 34 by way of the angled ends of the spring arms 43. When a certain torque is exceeded, the intermediate part 34 starts to rotate relative to the spring ring 35, whereupon, as the intermediate part continues to rotate, the angled ends of the spring arms 43 are first pushed radially outward, and then, upon continued rotation of the spring ring 35, they spring back again, wherein the ends latch into the adjacent groove 44.

So that the overload torque is the same in both directions, the spring arms 43 are arranged in opposing pairs. By not arranging the spring arms 43 in opposing pairs, it is possible to obtain a latching torque in one rotational direction which is different from that in the other direction.

Figure 7:
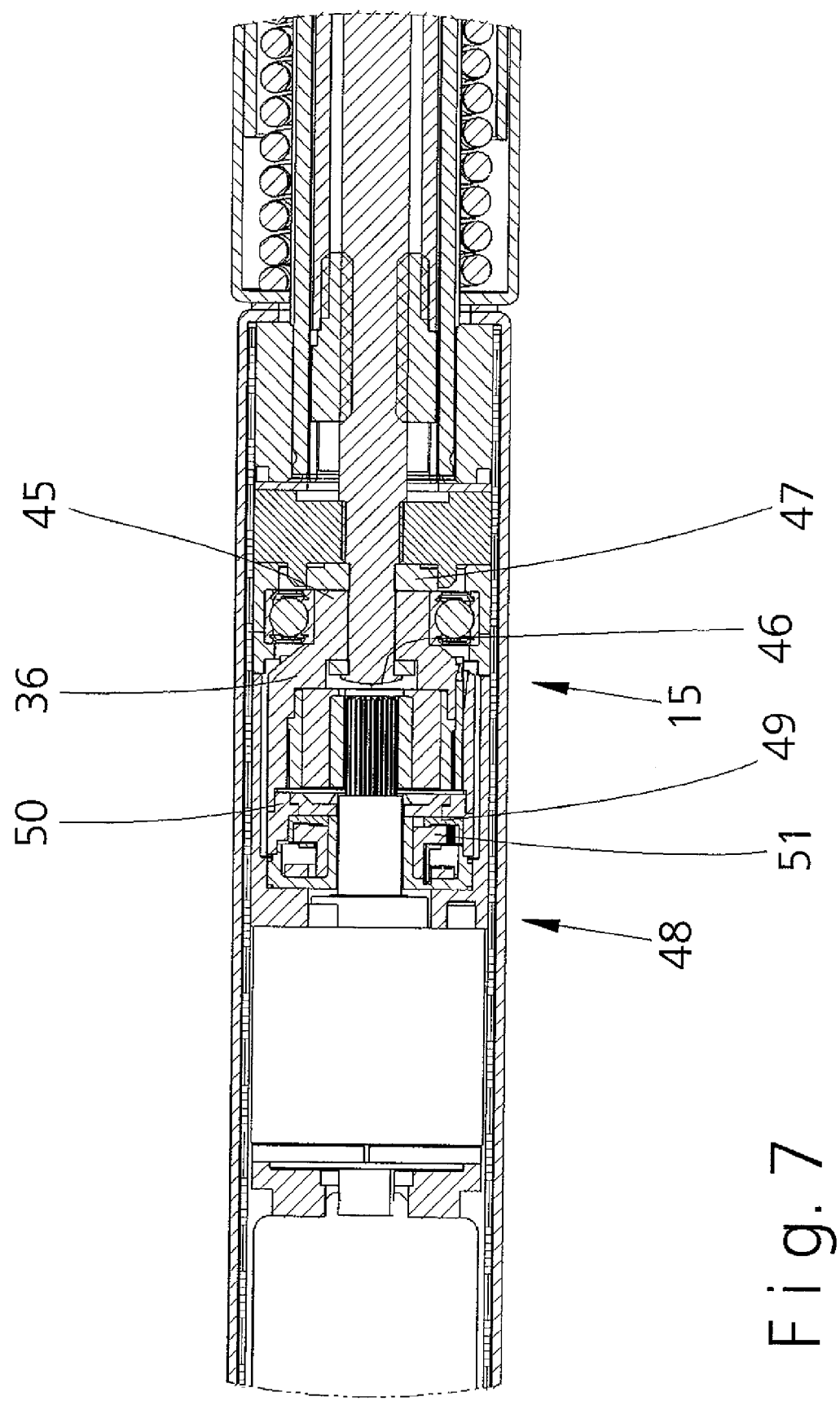

The clutch device 15 is supported radially and axially in the spindle bearing 31. For this purpose, as can be seen in FIGS. 1 and 7, a connecting device 45 with a smaller outside diameter is provided on the outer part. The threaded spindle 16 is introduced into this connecting device. Torque is transmitted to the threaded spindle 16 by sets of serrations. Other shaft-hub connections such as an axially secured screw connection or other positive or nonpositive types of connections can also be used. The threaded spindle 16 is secured axially in the connecting part 45 by a riveted connection 46. So that the clutch device 15 is held in place in the axial direction, a ring disk 47 is provided between the spindle bearing 31 and the guide tube 18. By way of the ring disk 47 and the components arranged around the clutch device 15, forces acting in the axial direction are conducted around the clutch device.

The embodiment shown in FIG. 7 comprises a sensor device 48. The sensor device 48 shown here comprises an internal gear 49, which is supported so that it can rotate and wobble, and which is driven by the outer part 36 of the clutch device 15, acting by way of a driver 50. The internal gear 49 comprises radially inward-pointing teeth, which mesh with the teeth of a gear 51, wherein, for example, a slider is moved along a resistance track, a Hall component is moved along a magnet, or a magnet is moved along a Hall component, to determine the position of the spindle and thus the position of the movable component relative to the stationary component.

It is obvious that the sensor device 48 can also be applied in the same or a similar manner to the embodiments described below.

Figure 8:
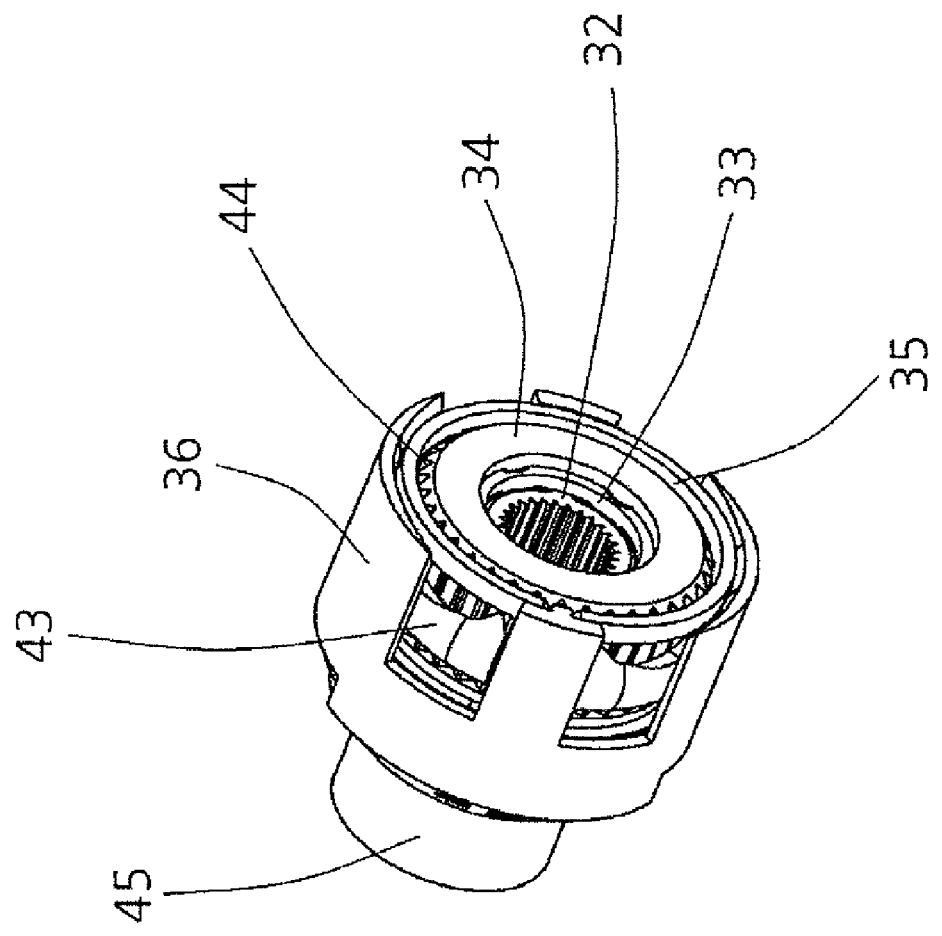
FIGS. 8-10 show another embodiment of the clutch device shown in FIGS. 1-7.
Figure 9:
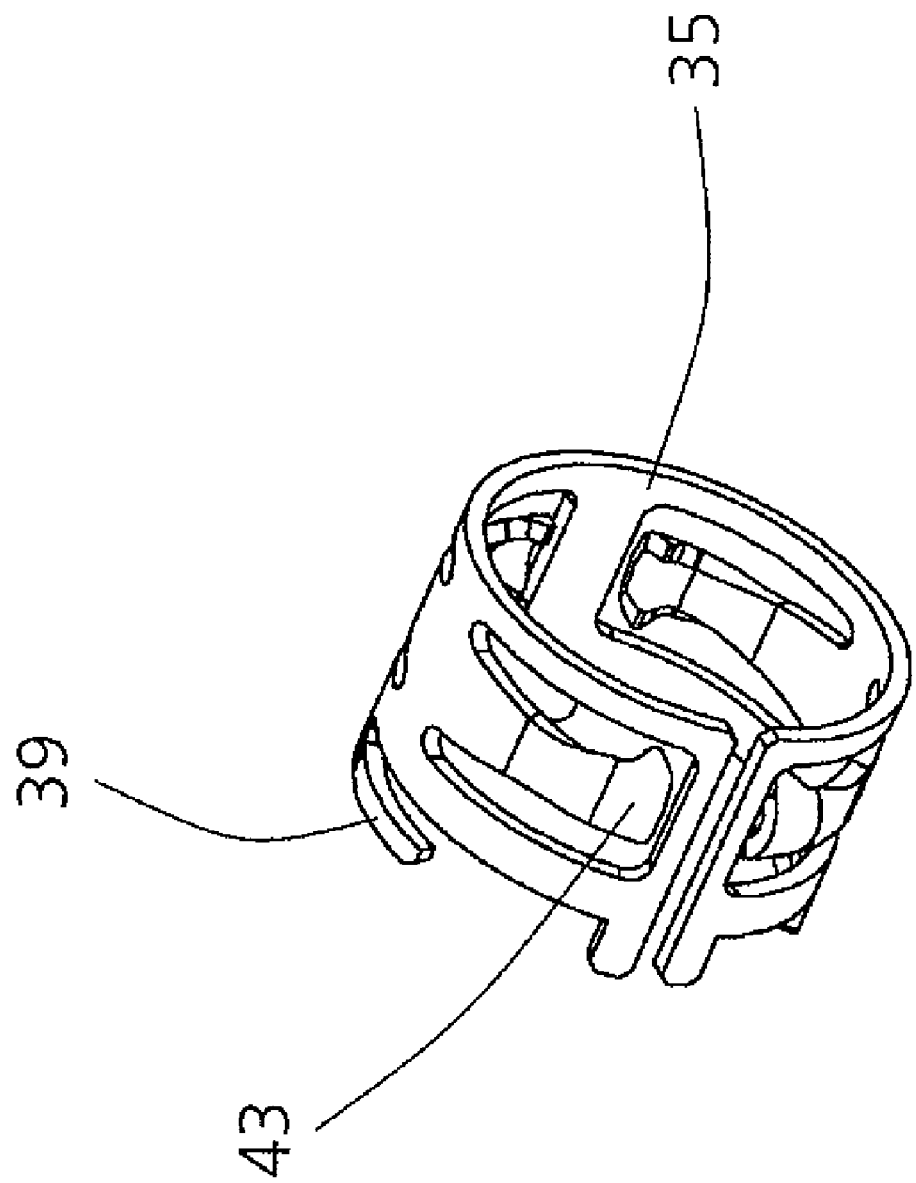
Figure 10:
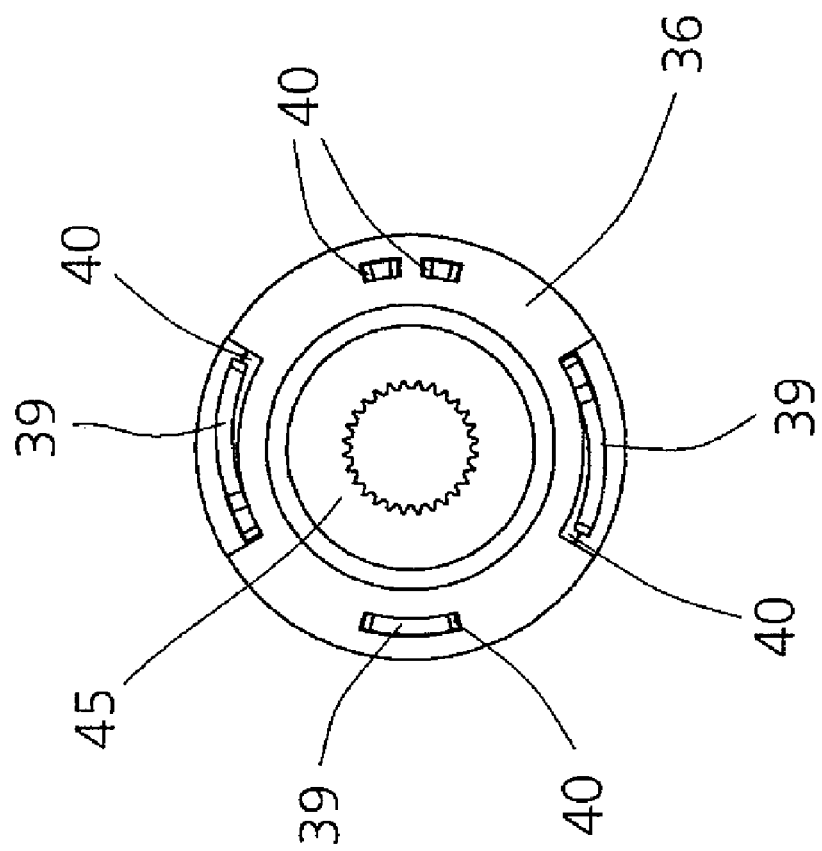

In the embodiment shown in FIGS. 8-10, some of the fingers 39 project all the way through the openings 40, wherein the ends of the fingers 39 are bent radially outward and latch with the outer part 36 at the end of the openings 40.

At their free ends, the spring arms 43 comprise two claw-like, radially inward-pointing projections, which engage in the grooves 44.

Figure 11:
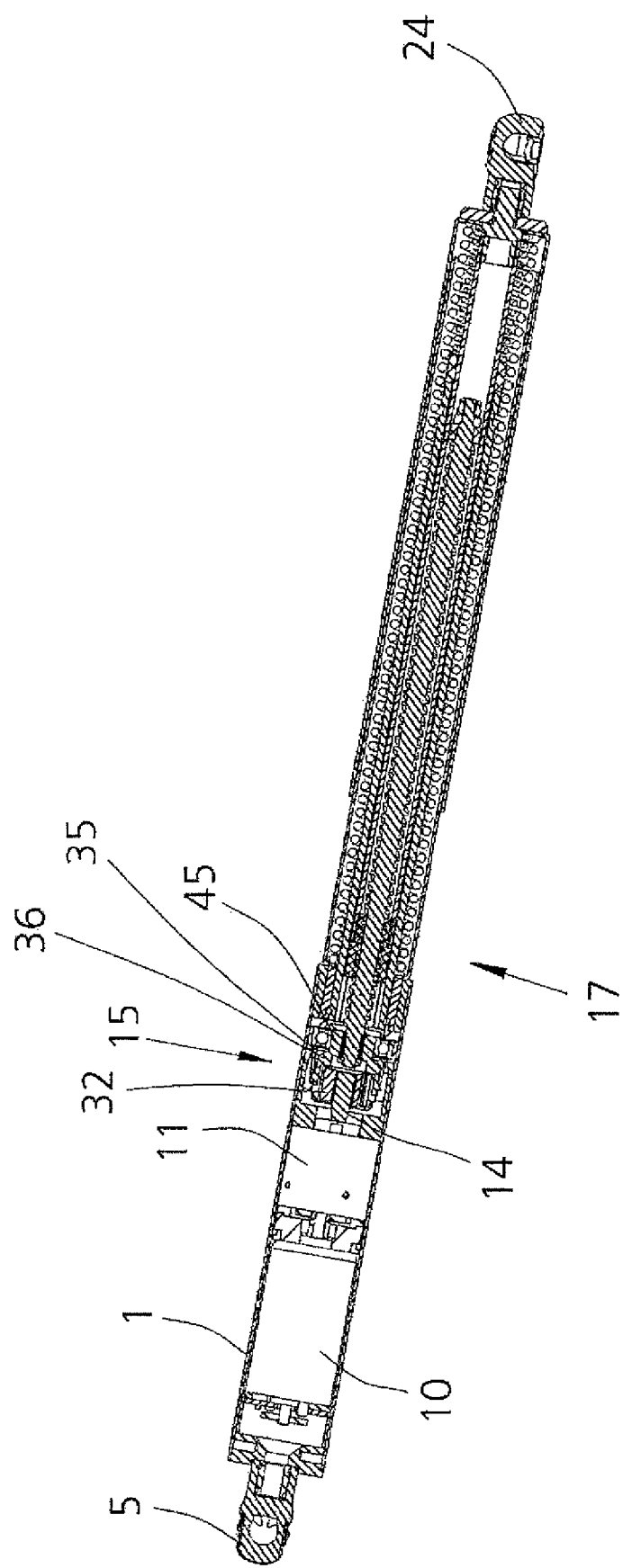
FIG. 11 shows a cross section through another drive device of the present invention.
Figure 12:
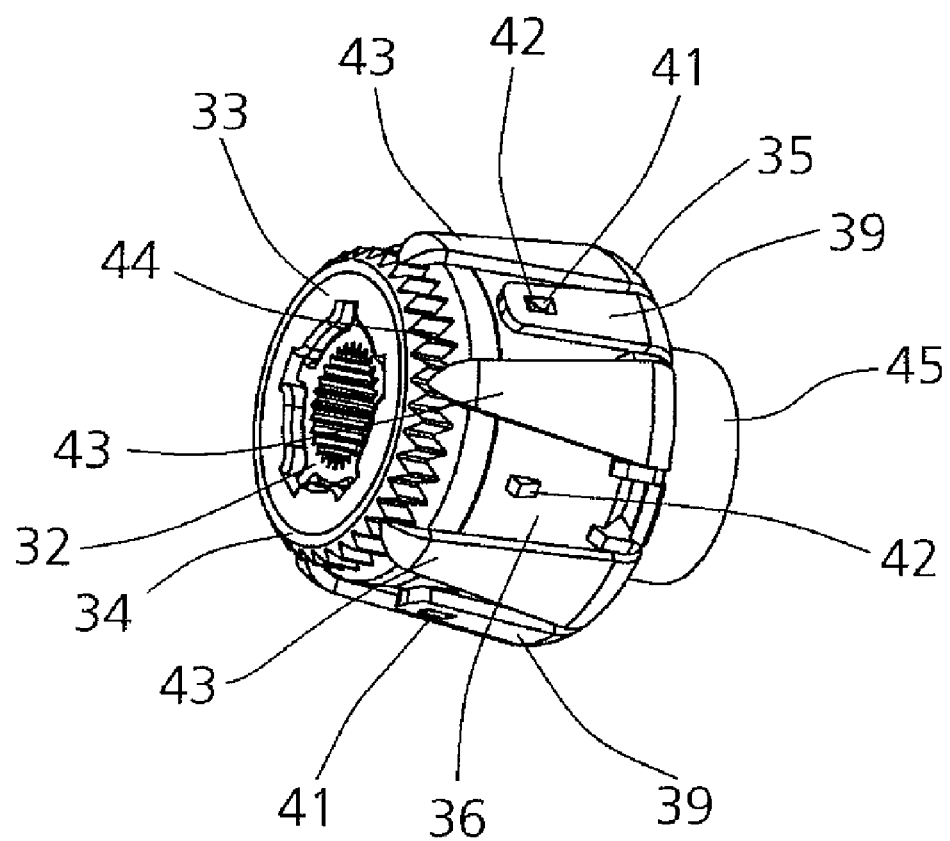
FIG. 12 shows a detailed view of the clutch device which is incorporated into the drive device according to FIG. 11.

The embodiment shown in FIG. 11 is essentially the same as that of the drive device shown in FIG. 1. For this reason, only the differences in the clutch device 15, which are shown in detail in FIG. 12, will be described in detail below.

As an additional axial and radial securing mechanism for the spring ring 35, the projections 42 are arranged on the outside surface of the outer part 36. These project into the through-openings 41 formed in the fingers 39 of the spring ring 35 when the ring is pushed onto the end of the outer part 36 which faces the connecting element 45. In the embodiment shown here, however, the fingers 39 extend axially over the outer part 36.

Several spring arms 43, furthermore, extend axially from the spring ring 35 over the outer part 36. These arms are bent over at their ends radially toward the inside and taper down toward their outer ends. The ends of the spring arms 43 engage in some of the grooves 44 formed in the intermediate part 34 The outer ends of the spring arms 43 preferably comprise the same shape as the grooves 44. The intermediate part 34 is accommodated partly and rotatably in the outer part 36, whereas the grooves 44 are arranged axially outside the outer part 36.

The inner part 32 acts together with the damping element 33 on the intermediate part 34 in the same way as the components described in conjunction with FIGS. 2-7 do.

Figure 13:
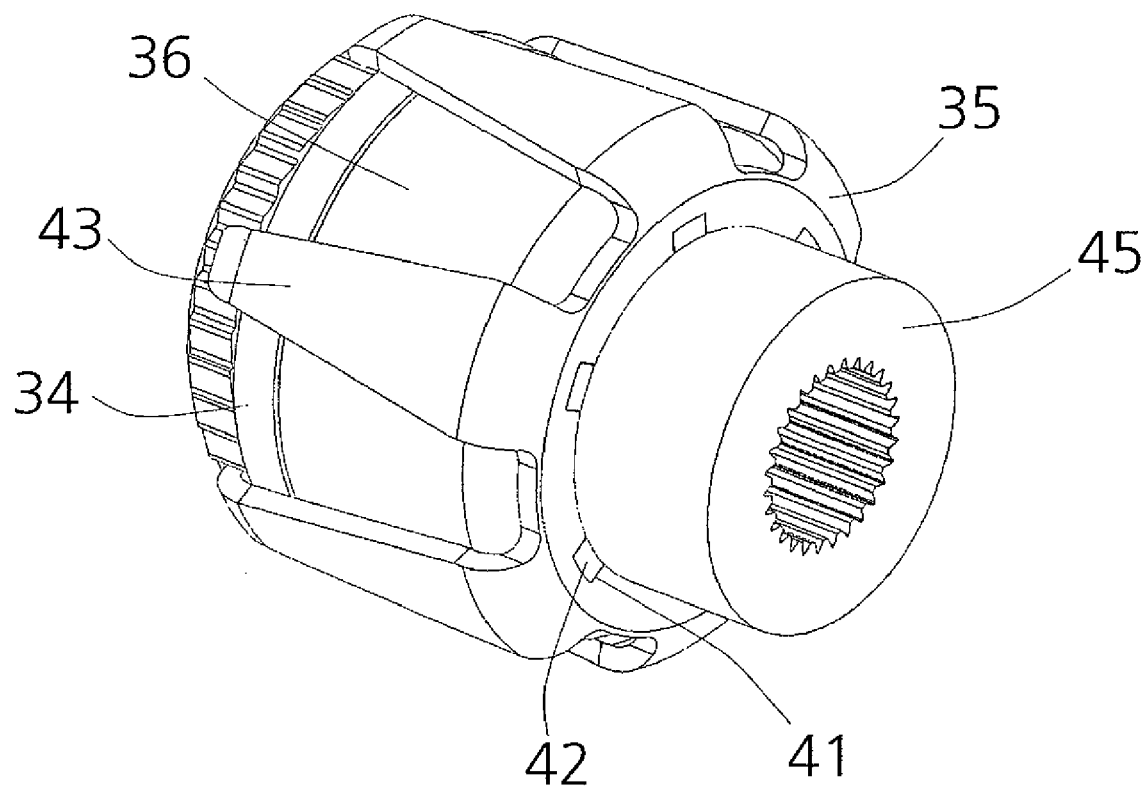
FIG. 13 shows another embodiment of the clutch device shown in FIGS. 11 and 12.

Another embodiment is illustrated in FIG. 13. The outer part 36 comprises, at the transition to the connecting element 45, several projections 42, which project into the through-openings 41 in the spring ring 35 when the ring is pushed onto the end of the outer part 36 which faces the connecting element 45. The spring arms 43 extend axially over the outer part 36. There is no need for the fingers 39 here.

Figure 14:
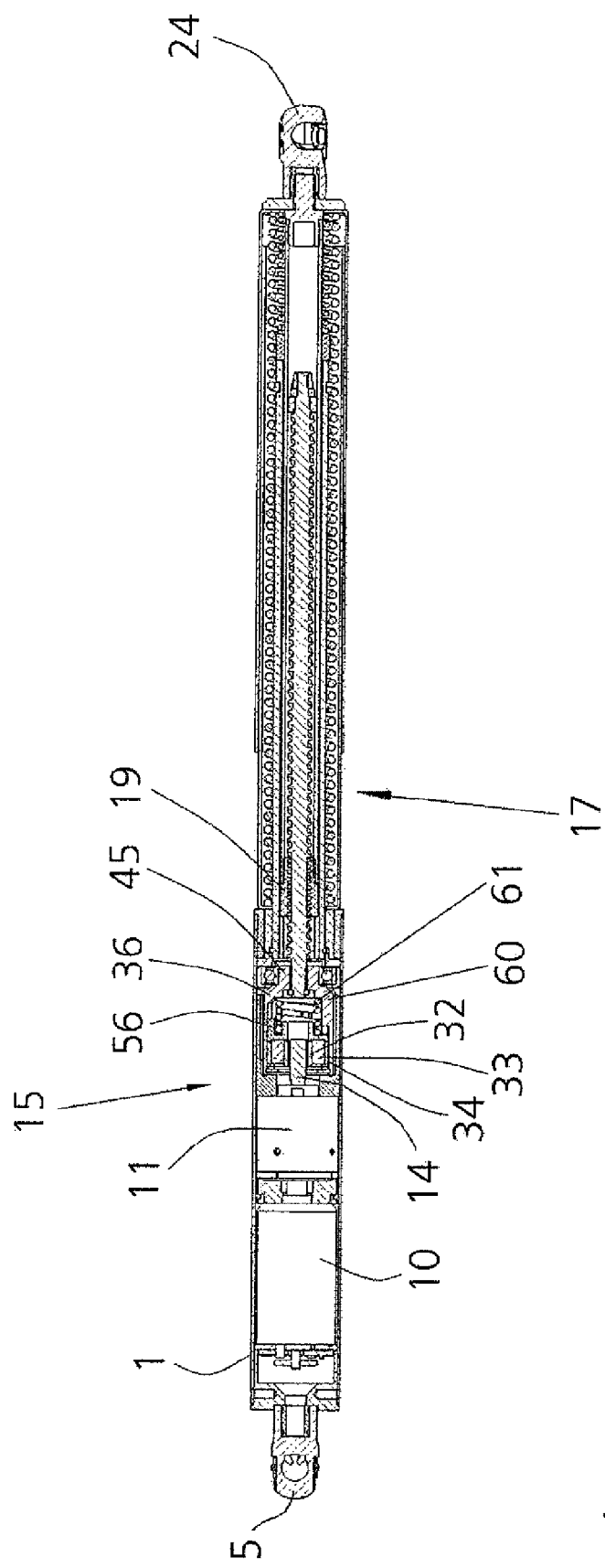
FIG. 14 shows a cross section through a further drive device of the present invention.

The embodiment shown in FIG. 14 is again essentially the same as the drive device shown in FIG. 1. In the following, therefore, only the differences in the design of the clutch device 15 illustrated in detail in FIGS. 15 and 16 will be discussed.

Figure 15:
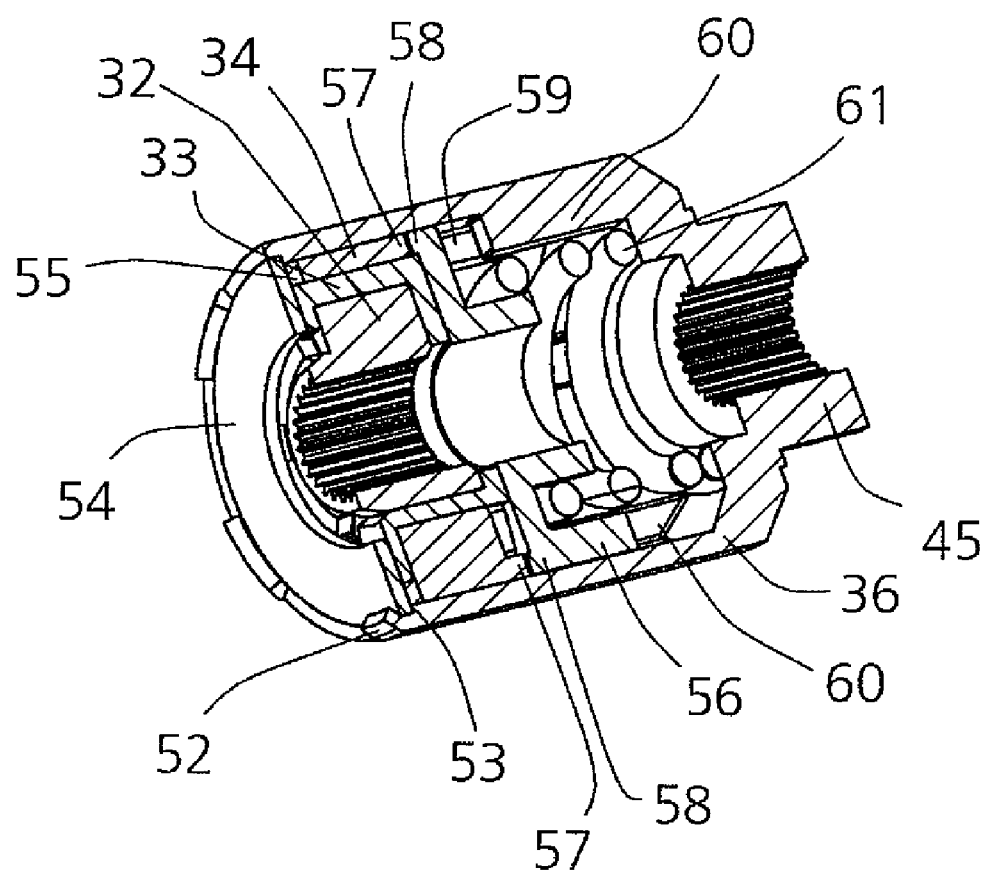
FIGS. 15 and 16 show detailed views, of the clutch device which is incorporated into the drive device according to FIG. 14.

On the end facing the gearbox 11, the outer part 36 shown in FIG. 15 comprises a retaining device 52 extending in the axial direction and forming a shoulder 53, on which a support disk 54 comes to rest. The retaining device, as shown here by way of example, can comprise several fingers, but it can also be designed as a flange or comprise a spring ring inserted into a groove. The outer ends of the fingers of the retaining device 52 shown here are bent over radially toward the inside and thus secure the support disk 54 on the outer part 36. A slip ring 55, the outside diameter of which is the same as or slightly smaller than the inside diameter of the outer part 36, lies on the support disk 54, inside the outer part 36. The intermediate part 34 then comes to rest in turn on this slip ring.

Figure 16:
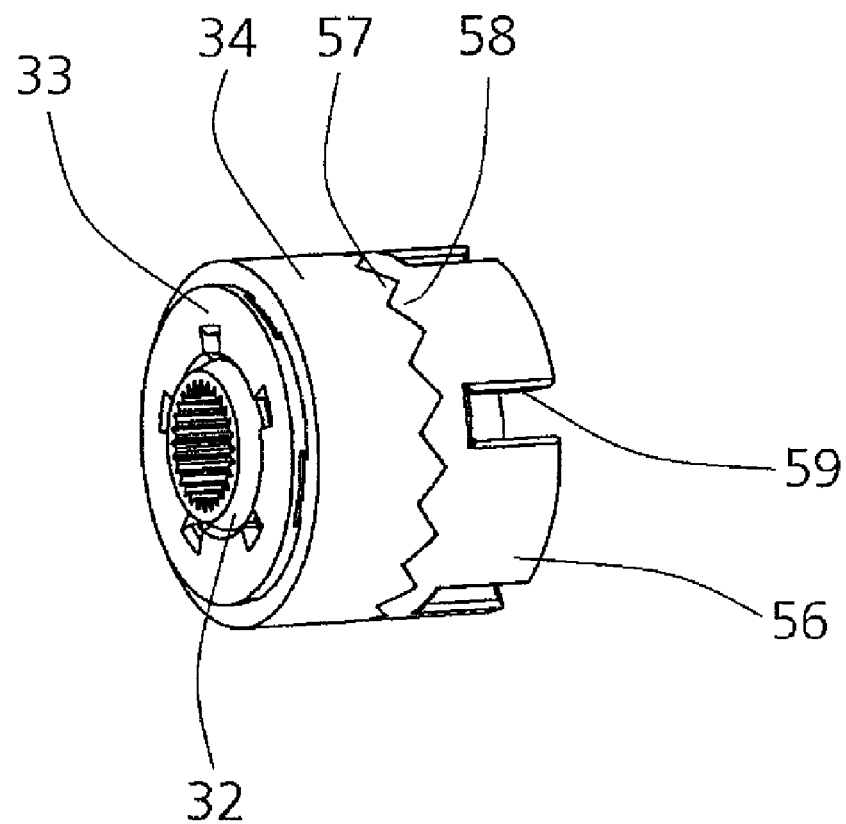

The damping element 33 is arranged between the inner part 32 and the intermediate part 34. At least part of the damping element 33 also extends between the support disk 54 and the intermediate part 34, but it does not touch the support disk 54. A slider 56 rests in turn on the intermediate part 34. The facing ends of the intermediate part 34 and the slider 56 are provided with corresponding sets of serrations 57 and 58, as can be seen in FIG. 16, in which, for the sake of clarity, the outer part has been left out. The slider 56 also comprises recesses 59, into which guide webs 60 formed in the inside surface of the outer part 36 engage and thus make it possible for the slider 56 to move axially in the outer part 36 but not to rotate. A spring element 61 pushes the slider 56 against the intermediate part 34 and thus the serrations 58 into the serrations 57.

The pretensioning force of the spring element 61 is strong enough that, under normal operating conditions, the torque coming from the gearbox 11 is transmitted to the threaded spindle 16 via the inner part 32, the damping element 33, the intermediate part 34, the slider 56, and the outer part 36. The amount of torque which can be transmitted depends on the angle of the tooth flanks, on the level of the axial pretensioning force, and on the coefficient of static friction of the tooth surfaces, of the slip ring, and of the slider, which itself depends on the material and on its roughness. In addition to the action of a positive connection, therefore, there is also the action of a nonpositive connection, wherein the positive action is dominant. In the case of only a small torque difference between the threaded spindle 16 and the gearbox output shaft 14 and also in the resting state, the serrations 57 and 58 mesh with each other. When the torque difference starts to increase, the serrations 57 and 58 continue to mesh with each other until the pretensioning force of the spring element 61 is no longer sufficient to prevent the serrations 57 and 58 from rotating relative to each other after the prevailing static friction and the flank angles of the serrations have been overcome. Above this torque overload value, which can be adjusted by way of the pretensioning force of the spring element 61, the serrations 57, 58 are no longer engaged.

Figure 17:
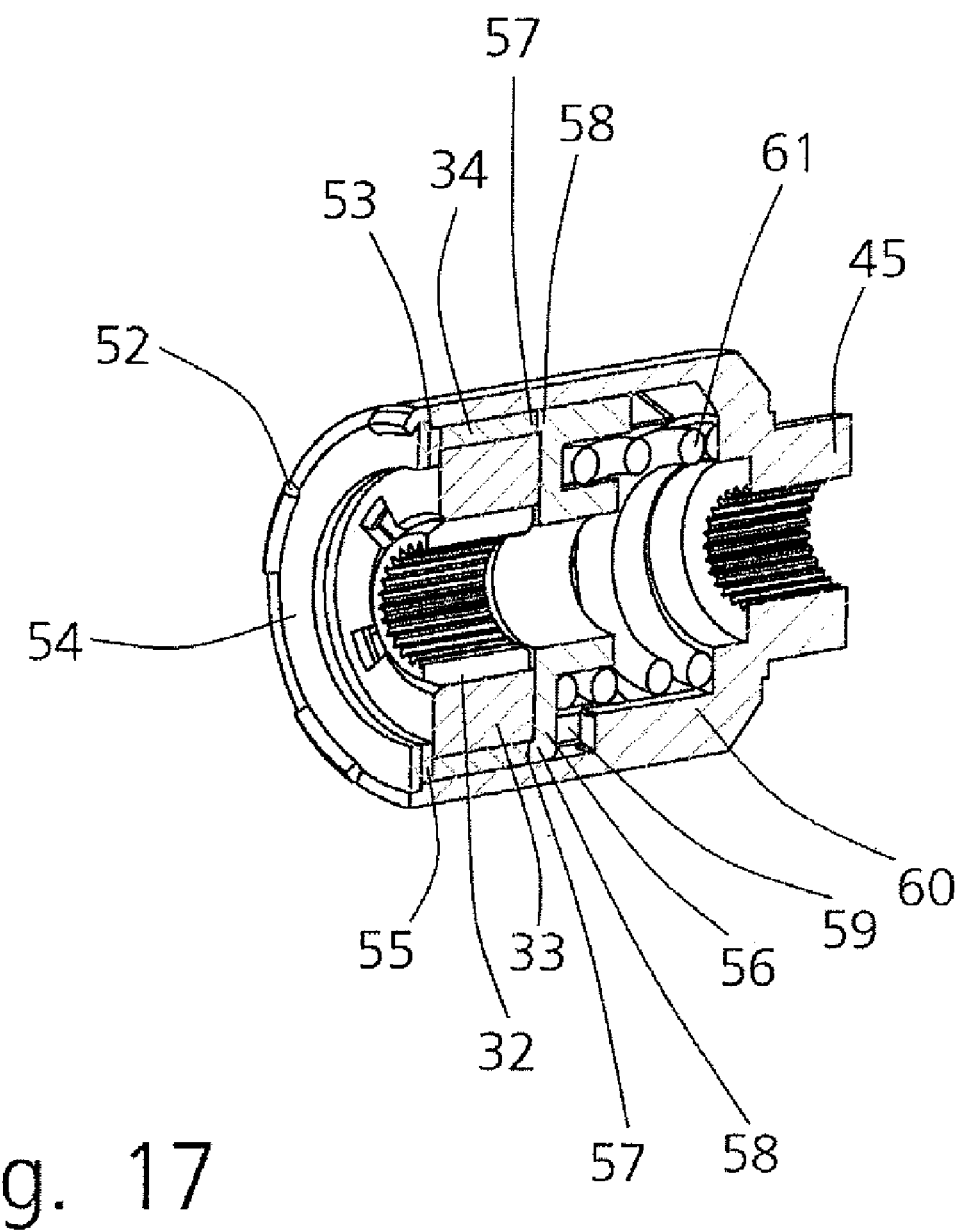
FIGS. 17-19 show additional embodiments of the clutch device shown in FIGS. 14-16.

The embodiment of the clutch device shown in FIG. 17 is characterized in that the damping element 33 does not come to rest against the support disk 54 when, during the introduction of strong torque, the damping element is deformed and a bead is formed facing toward the support disk, as a result of which the frictional force could be increased. The damping element is supported in the axial direction only on the slip ring 55.

Figure 18:
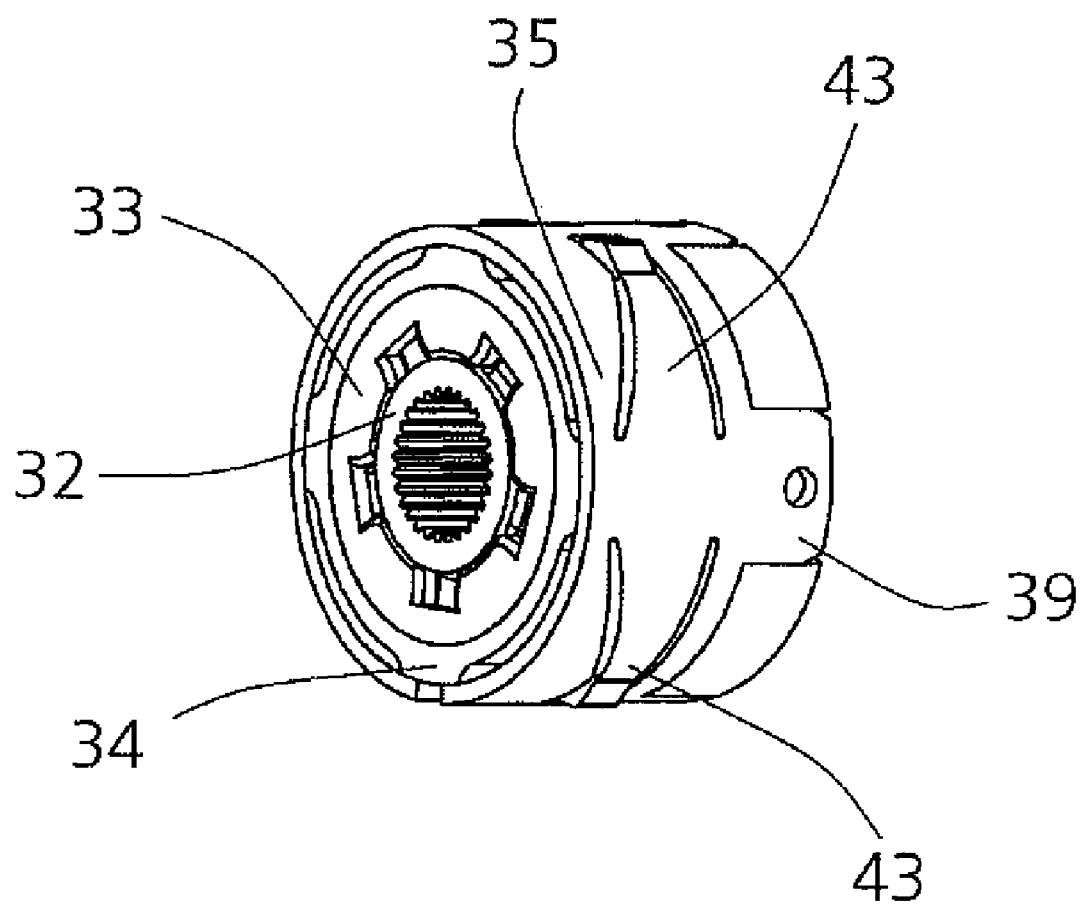
Figure 19:
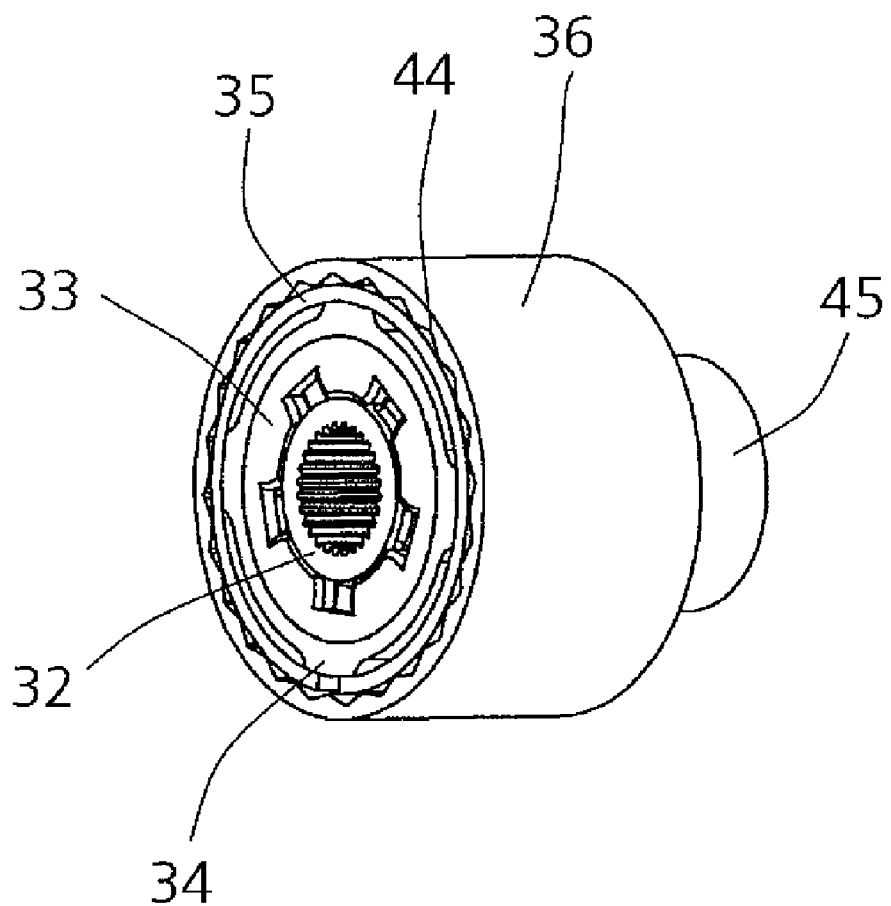

In the case of the embodiment of the clutch device shown in FIGS. 18 and 19, the spring ring 35 is connected permanently and thus nonrotatably to the intermediate part 34 by the fingers 39, and the spring ring 35 is connected to the outer part 36 by the spring arms 43, wherein in this case the grooves 44 are formed on the inside lateral surface of the outer part 36.

The invention is not limited by the embodiments described above which are presented as examples only but can be modified in various ways within the scope of protection defined by the appended patent claims.

We claim:

1. A drive device comprising:
   a first fastening device (15) connectable to one of a stationary base part and to a movable part;
   a second fastening device (24) connectable to one of the movable part and to the stationary base part;
   a spindle drive (17) comprising a threaded spindle (16) and a spindle nut (19) mounted on said threaded spindle (16) for moving said first and the second fastening devices (15, 24) axially relative to each other; and
   a rotary drive (9) for rotating said spindle drive (17) by way of an overload safety device including a nonrotatable connection between two components which can be released when a predetermined torque is exceeded;
   said overload safety device being formed by a clutch device (15) comprising an inner part (32); a damping element (33); an intermediate part (34) and an outer part 36; said inner part (32) connected to said rotary drive (9), said inner part rotating said intermediate part (34) by way of said damping element (33) and, by way of said intermediate part (34), rotating said outer part (36) connected to said spindle drive (17).

2. The drive device according to claim 1, wherein said inner part (32) cooperates with said damping element (33) and said intermediate part (34) to form a claw coupling.

3. The drive device according to claim 1, additionally comprising a spring ring (35) including spring arms (43); and grooves formed on the inside lateral surface of said outer part (36); and wherein said spring ring (35) is permanently and nonrotatably connected to said intermediate part (34), and said spring ring (35) is connected to said outer part (36) by way of said spring arms (43).

4. The drive device according to claim 1, additionally comprising a spindle bearing (31) for radially and axially supporting said clutch device (15) and further comprising a connecting device 45 on said outer part (36) for introducing said threaded spindle (16).

5. The drive device according to claim 1, additionally comprising a sensor device (48) including an internal gear (49) supported within said sensor device with the freedom to rotate and to wobble; and further comprising a driver (50); said internal gear (49) being driven by said outer part (36) of said clutch device (15) by said driver (50).

6. The drive device according to claim 1, wherein said inner part (32) comprises radially outward-pointing projections (37) on its outer lateral surface, and said intermediate part (34) comprises an equal number of radially inward-pointing projections (38).

7. The drive device according to claim 6, wherein said projections (37) of said inner part (32) and said projections (38) of said outer part (34) are offset from each other and are not touching each other.

8. The drive device according to claim 7, additionally comprising a support disk (54) and wherein said outer part (36) comprises, at the end facing said rotary drive (9), a retaining device (52) forming a shoulder (53) against which said support disk (54) comes to rest.

9. The drive device according to claim 8, wherein said outer part (36) has an inside diameter; and additionally comprising a slip ring (55) resting inside said outer part (36) on said support disk (54) and having an outside diameter not greater than said inside diameter of said outer part (36).

10. The drive device according to claim 9, wherein said intermediate part (34) comes to rest against said slip ring (55).

11. The drive device according to claim 8, wherein said retaining device (52) comprises one of a spring ring, inserted into a groove and designed as a flanged-over section and several fingers, the free ends of which are bend over radially toward the inside and secure said support disk (54) on said outer part (36).

12. The drive device according to claim 11, wherein said damping element (33) is arranged between said inner part (32) and said intermediate part (34) and extends at least partially between said support disk (54) and said intermediate part (34) without touching said support disk (54).

13. The drive device according to claim 11, additionally comprising a slip ring (55); and wherein said damping element (33) is supported in the axial direction against said slip ring (55).

14. The drive device according to claim 11, wherein said intermediate part (36) includes end surfaces; and additionally comprising a slider (56) having end surfaces facing said end surfaces of said intermediate part (36); said slider resting on said the intermediate part (34); and wherein said facing end surfaces of said intermediate part (36) and said slider (56) are provided with corresponding serrations (57) and (58).

15. The drive device according to claim 14, wherein said slider (56) comprises recesses (59); said inside surface of said outer part (36) comprises guide webs (60) for engaging said recesses (59); and additionally comprising a spring element (61) for pushing said slider (56) against said intermediate part (34) and said serrations (58) of said slider against said serrations (58) of said intermediate part (36).

16. The drive device according to claim 1, additionally comprising a spring ring (35) for connecting said intermediate part (34) to said outer part (36), said spring ring (35) being held in place on said outer part (36) in axial and radial direction.

17. The drive device according to claim 16, wherein said outer part (36) comprises recesses (40); and said spring ring (35) comprises several fingers (39) extending axially into an equal number of said recesses (40) formed in said outer part (36).

18. The drive device according to claim 16, additionally comprising projections (42) formed in said recesses (40) of said outer part (36); and wherein each of said fingers (39) comprises a through-opening (41) for engaging said projections (42) formed in said recesses (40) of said outer part (36).

19. The drive device according to claim 17, wherein some of said fingers (39) pass completely through said openings (40), and wherein the ends of said fingers (39) are bent over radially toward the outside and latch with said outer part (36) at the ends of said openings (40).

20. The drive device according to claim 16, additionally comprising radially circumferential grooves (44) on the outside lateral surface of said intermediate part (34); and wherein said spring ring (35) comprises spring arms (43) radially arranged for connecting said intermediate part (34) by engaging in said radially circumferential grooves said grooves (44) being directly adjacent to each other.

21. The drive device according to claim 20, wherein said spring arms (43) include free ends and at said free ends two radially inward-pointing claw projections which engage in said grooves (44).

22. The drive device according to claim 16, wherein said spring ruing (35) additionally comprises fingers (39) having through-openings (41) therein; and comprising projections (42) arranged on the outside surface of said outer part (36) and for holding said spring ring (35) in place; said projections (42) projecting into said through-openings (41) formed in said fingers (39) of said spring ring (35) when said ring is pushed onto the end of said outer part (36) which faces a connecting element (45); said fingers (39) extending axially over said outer part (36).

23. The drive device according to claim 22, additionally comprising grooves (44) formed on said intermediate part (34); and wherein said spring ring (45) comprises several spring arms (43) extending axially from said spring ring (35) over said outer part (36), said arms being bent over at their ends radially toward the inside and tapering down toward their outer ends, and wherein the ends of said spring arms (43) engage in at least some of said grooves (44) formed on said intermediate part (34).

24. The drive device according to claim 23, wherein a part of said intermediate part (34) is accommodated rotatably in said outer part (36); said grooves (44) being arranged axially outside said outer part (36).

25. The drive device according to claim 16, wherein said spring ring (35) has through-openings (41) and additionally comprising a connecting element (45) and projections (42) in said outer part (36) at the transition to said connecting element (45); said projections (42) projecting into said through-openings (41) of said spring ring (35) when said ring is pushed onto the end of said outer part (36) which faces said connecting element (45).

* * * * *